(No Model.)

W. S. WILSON.
PROCESS OF MANUFACTURING RIVETS, STUDS, &c.

No. 522,247. Patented July 3, 1894.

Witnesses
J. E. Cameron
Donald C. Ridout

Inventor
William S. Wilson
by C. H. Riches
his attorney

UNITED STATES PATENT OFFICE.

WILLIAM SANFIELD WILSON, OF BRANTFORD, CANADA, ASSIGNOR OF ONE-HALF TO DAVID S. HENDERSON, OF SAME PLACE.

PROCESS OF MANUFACTURING RIVETS, STUDS, &c.

SPECIFICATION forming part of Letters Patent No. 522,247, dated July 3, 1894.

Application filed December 22, 1893. Serial No. 494,464. (No specimens.)

*To all whom it may concern:*

Be it known that I, WILLIAM SANFIELD WILSON, machinist, of Brantford, in the county of Brant and Province of Ontario, Canada, have invented a certain new and useful Process of Manufacturing Rivets, Studs, &c.; and I hereby declare that the following description is sufficiently full, clear, and exact as to enable others skilled in the art to which it appertains to make use of the same.

In the manufacture of machinery of all descriptions and more particularly in the manufacture of bicycle chains and other bicycle parts, it is advisable and necessary to harden that surface upon which there is abrasion and wear, and it frequently happens that in addition to the hardening of the wearing surface of the part, it is necessary to have the ends of the same parts soft for riveting and other purposes. Hitherto it has never been possible to manufacture diminutive parts with hardened bearing surfaces and softened ends, either in as convenient or as economical a manner, or at as reasonable a cost as would enable manufacturers to place these parts upon the market at a moderate price.

The object of this invention is to devise a process by means of which the working surface of the rivet or other part may be hardened to any required degree of hardness, and the ends or other portions of the same rivet or other part may be permitted to remain soft, in order that they can be riveted or otherwise operated on. The process consists of carbonizing or charging soft steel or iron with carbon, then cutting the carbonized skin from that part required to remain soft, then heating the entire part to the required temperature, and immediately afterward cooling it by submerging it in cold water or other fluid suitable for the purpose.

To more completely illustrate the invention I will describe the process as applied to the manufacture of rivets and rollers for bicycle chains.

Figure 1:
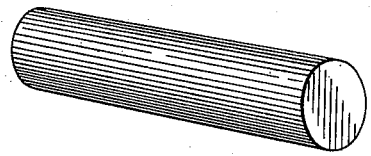
Figure 2:
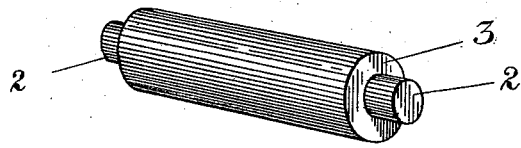
Figure 3:
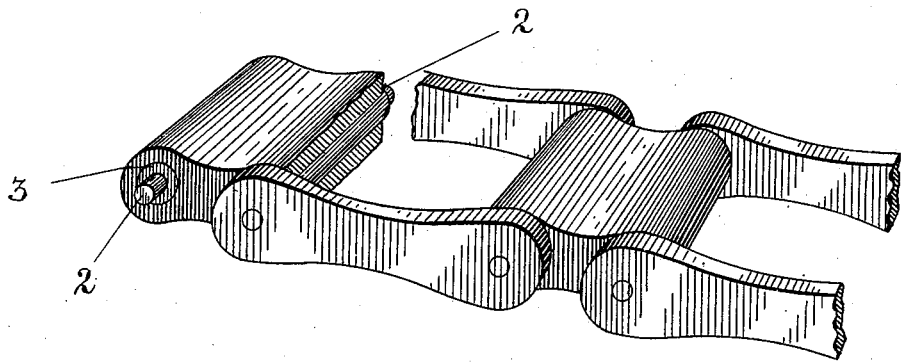

In the drawings: Figure 1 is a view of a rivet ready to be charged, or just after having been charged with carbon. Fig. 2 is a view of the same rivet ready to be hardened showing the carbonized skin cut from each end to form the requisite shoulders, and leaving the necessary amount of metal to form the rivet heads. Fig. 3 is a view of the same device applied to a bicycle chain.

Like numerals of reference refer to like parts throughout the specification and drawings.

The process will herein be described as employed in connection with the manufacture of rivets, although it may be employed in connection with the manufacture of any other part of machinery. The metal for the rivet is either cut into the required lengths as shown in Fig. 1 of the drawings, and these lengths are charged with the requsite amount of carbon, or the metal for the rivets can be charged with carbon while in the bar and afterward cut into the required lengths. After the metal has been properly carbonized, the carbonized skin is cut away for the required and predetermined distance from each end 2, as shown in Fig. 2 of the drawings, to form the shoulders 3 and also to provide the requisite amount of soft metal at each end 2, to form what might be termed the shank and the rivet head. The rivet is then heated to the required temperature, and is immediately submerged in water, or in other suitable hardening fluid.

It might here be stated that only that portion of the rivet charged with the carbon would be hardened, while the remaining part of the rivet would remain soft after having been heated and submerged in the hardening fluid. By this means a piece of machinery may be provided with surfaces respectively of hard and soft metal by a simple, economical and cheap method.

Having thus fully described my invention, what I claim as new, and desire to secure by Letters Patent, is—

The herein described process for providing metal with surfaces of hardened and soft metal respectively which consists of charging the metal with a sufficient quantity of carbon, then cutting the carbonized skin from that portion required to be soft, then heating the metal to the required temperature, and then submerging the metal in a hardening fluid, substantially as and for the purpose specified.

Brantford, December 8, 1893.

WILLIAM SANFIELD WILSON.

In presence of—
　WALTER A. WILKES,
　M. E. BONBAM.